United States Patent
Blevins

(10) Patent No.: US 9,527,355 B1
(45) Date of Patent: Dec. 27, 2016

(54) FOLDING TONGUE TRAILER HITCH

(71) Applicant: Timothy Donald Blevins, De Kalb, TX (US)

(72) Inventor: Timothy Donald Blevins, De Kalb, TX (US)

(73) Assignee: Timothy D. Blevins, Dekalb, TX (US)

( * ) Notice: Subject to any disclaimer, the term of this patent is extended or adjusted under 35 U.S.C. 154(b) by 0 days.

(21) Appl. No.: 14/835,238

(22) Filed: Aug. 25, 2015

(51) Int. Cl.
*B60D 1/54* (2006.01)
*B62D 63/06* (2006.01)
*B60D 1/155* (2006.01)

(52) U.S. Cl.
CPC .................. *B60D 1/54* (2013.01); *B60D 1/155* (2013.01); *B60D 2001/544* (2013.01); *B62D 63/061* (2013.01)

(58) Field of Classification Search
CPC ..... B60D 1/54; B60D 1/155; B60D 2001/544; B62D 63/061
See application file for complete search history.

(56) References Cited

U.S. PATENT DOCUMENTS

| | | | |
|---|---|---|---|
| 4,786,073 A * | 11/1988 | Harper | B62D 63/061 280/491.1 |
| 6,623,028 B1 * | 9/2003 | Johnston | B62D 63/061 280/656 |
| 8,151,426 B2 * | 4/2012 | Schneider | B60D 1/07 280/417.1 |
| 2005/0184485 A1 * | 8/2005 | Timmermans | B62D 63/061 280/656 |
| 2006/0091646 A1 * | 5/2006 | Steins | B62D 63/061 280/656 |
| 2011/0221168 A1 * | 9/2011 | Alexander | B62D 63/061 280/639 |
| 2011/0266776 A1 * | 11/2011 | Kapels | B60D 1/06 280/656 |
| 2013/0038038 A1 * | 2/2013 | Bernard | B62D 63/062 280/415.1 |
| 2015/0321727 A1 * | 11/2015 | Fix | B62K 27/12 280/204 |

* cited by examiner

*Primary Examiner* — Anne Marie Boehler
*Assistant Examiner* — Marlon A Arce
(74) *Attorney, Agent, or Firm* — Sinorica, LLC

(57) ABSTRACT

A folding tongue trailer hitch for installation on a towable vehicle provides the ability to store the hitch while not in use for aesthetic and space efficiency purposes. A vehicle attachment frame is connected to the towable vehicle, and a hitch support frame is hingedly connected to the vehicle attachment frame by a hitching linkage. A hitching element is connected to the hitch support frame opposite the hinging linkage and may be any pertinent towing element. An angular lock releasably secures the hitch support frame in the lowered position for towing, utilizing receiving slots in the vehicle attachment frame and the hitch support frame into which locking rods may be inserted to lock the hitch support frame in the lowered position. A first and second lateral arm of the hitch support frame are positioned symmetrically about a central arm of the hitch support frame for structural support.

13 Claims, 3 Drawing Sheets

FOLDING TONGUE TRAILER HITCH

FIELD OF THE INVENTION

The present invention relates generally to transport. More particularly, the present invention relates to towing and trailer hitches.

BACKGROUND OF THE INVENTION

Transportation or transport is the movement of people, animals and good from one location to another. Modes of transport include air, rail, road, water, cable, pipeline and space. Transport can be divided into infrastructure, vehicles and operations. Transport is important because it enables trade between persons and businesses, which is essential for the development and enterprise of civilizations, businesses and persons. Though individual people and animals are capable of carrying good from one location to another, transport in the modern world is typically carried out through the use of vehicles such as automobiles, bicycles, buses, trains, trucks, helicopters, watercraft, spacecraft, or aircraft.

Transport of goods or supplies by individuals or businesses is often accomplished through ground motor vehicles such as automobiles, which are wheeled, self-powered motor vehicle used for transportation. Automobiles are powered by an engine or motor, usually an internal combustion engine, an electric motor, or some combination of the two. Many types of motor vehicles exist, from small sedans designed for personal transport to 18-wheeler trucks designed for moving large quantities of items at once.

Occasionally or daily, individuals or businesses may desire to move large items or large quantities of items from one location to another for various reasons. To accomplish this, a motor vehicle such as a truck is utilized which has a built-in storage space large enough to accommodate the items to be moved, or an unpowered wheeled vehicle such as a trailer with sufficient storage space is towed by a vehicle with sufficient towing capacity by coupling the trailer behind the powered vehicle. Trailers are typically coupled to powered vehicles by a hitch, which is a linkage attached to the chassis of a vehicle for towing. Hitches may take many forms including a tow ball, a tow pin, a tow hook with a trailer loop, or other forms. Hitches are typically permanently fixed to the chassis of the trailer or other unpowered, towable vehicle, and thus are prone to occupying unnecessary space, inhibiting storage and being aesthetically unpleasing.

Therefore, the object of the present invention is to provide a trailer hitch for a towable vehicle which can be folded into a stored position to for space reduction and aesthetic improvement.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced without the implementation of some features as they are described. It should be understood that some details have not been described in detail in order to not unnecessarily obscure focus of the invention.

The present invention is a folding trailer hitch for use with an unpowered towable vehicle that can fold into a storage position for efficient space usage and aesthetics when not in use. The folding trailer hitch preferably is a tongue-type trailer hitch, with some of the structure of the trailer hitch being positioned longitudinally outward from the center of the trailer hitch to increase structural strength and support.

Figure 1:
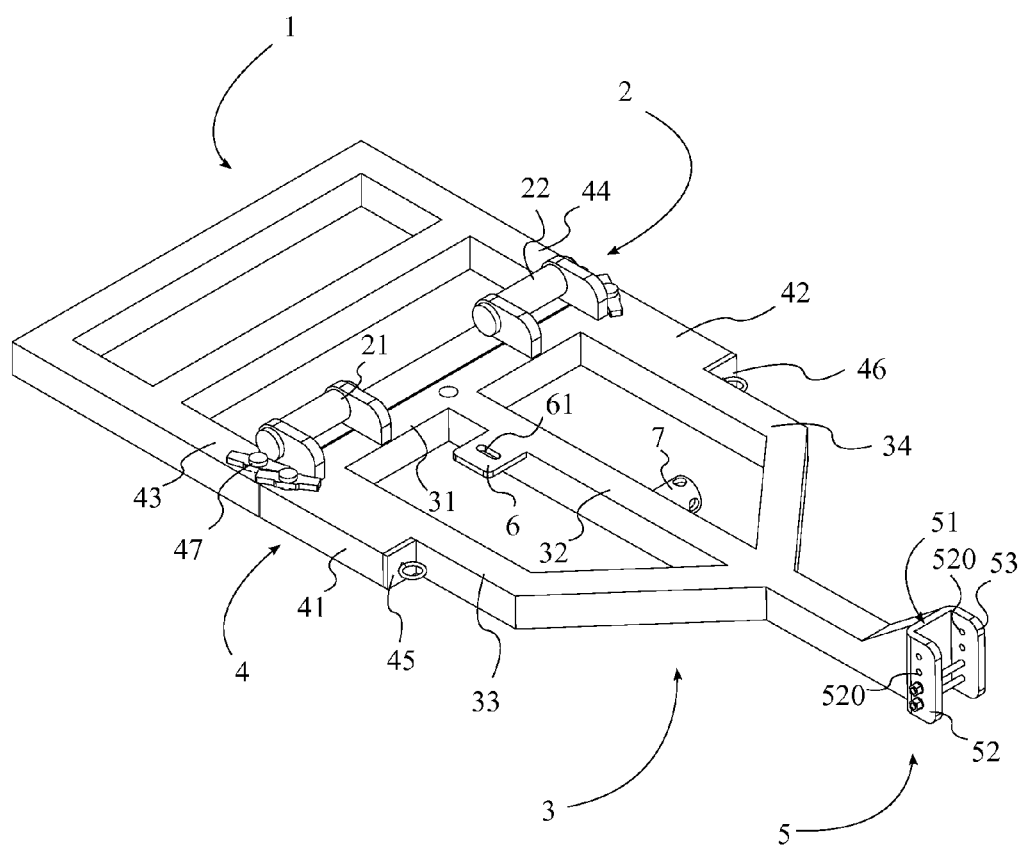
FIG. 1 is a perspective view of the present invention in the lowered position.
Figure 2:
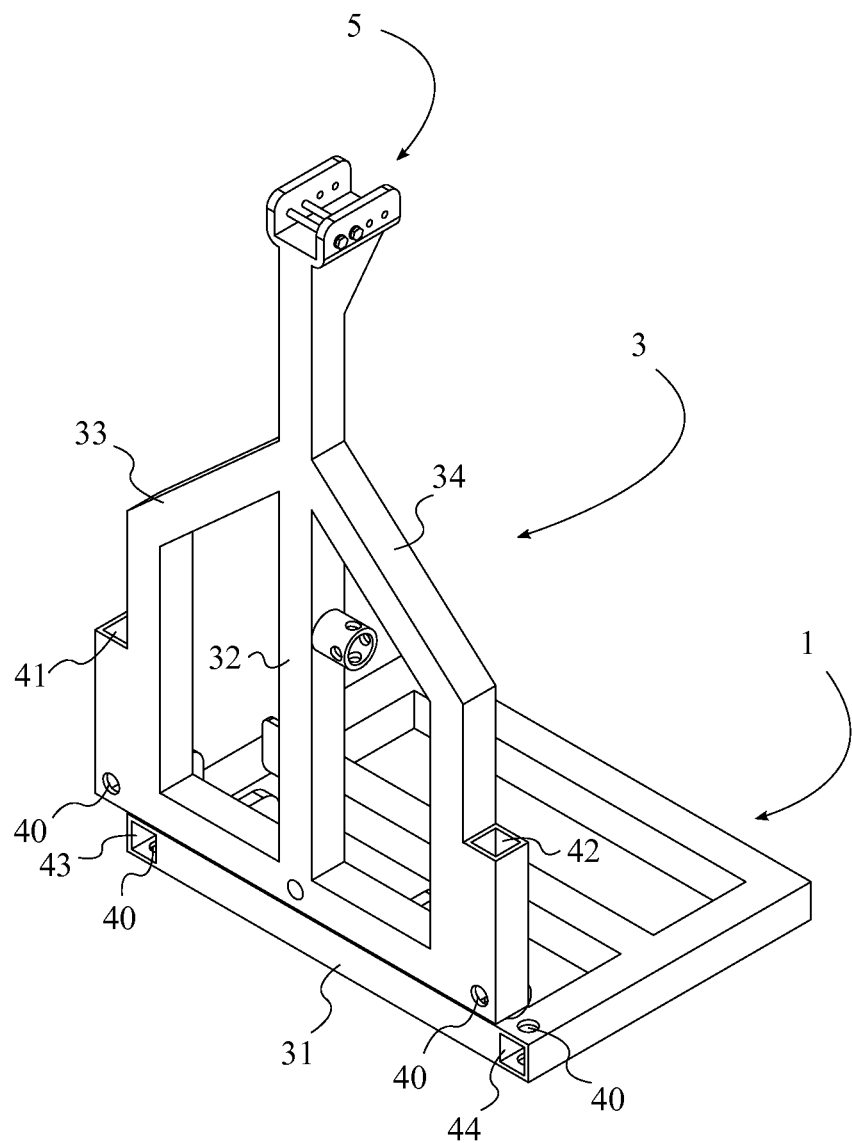
FIG. 2 is a perspective view of the present invention in the raised position.
Figure 3:
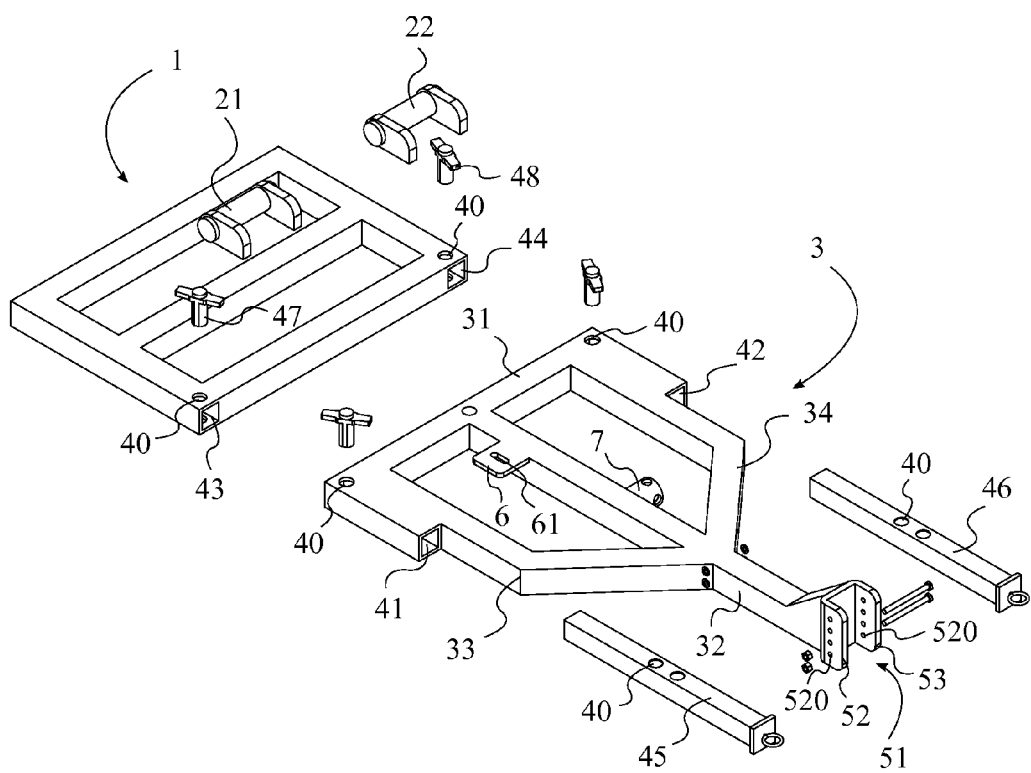
FIG. 3 is an exploded perspective view of the present invention in the lowered position.

Referring to FIGS. 1-3, the preferred embodiment of the present invention comprises a vehicle attachment frame 1, a hinging linkage 2, a hitch support frame 3, an angular lock 4, and a hitching element 5.

The hitch support frame 3 is hingedly connected to the vehicle attachment frame 1 by the hinging linkage 2. The angular lock 4 is releasably engaged between the vehicle attachment frame 1 and the hitch support frame 3. The angular lock 4 prevents the hitch support frame 3 from rotating with respect to the vehicle support frame when the angular lock 4 is engaged. The hitching element 5 is connected to the hitch support frame 3 opposite the hinging linkage 2 along the hitch support frame 3.

The preferred embodiment of the hitch support frame 3 comprises a rear portion 31, a central arm 32, a first lateral arm 33 and a second lateral arm 34. The central arm 32 is connected between the rear portion 31 and the hitching element 5, and the hinging linkage 2 is connected between the vehicle attachment frame 1 and the rear portion 31. Preferably, the first lateral arm 33 and the second lateral arm 34 are positioned symmetrically about the central arm 32, and are connected between the rear portion 31 and the central arm 32 adjacent to the hitching element 5.

It is contemplated that any suitable means or linkage may be utilized to implement the hinging linkage 2 to allow the hitch support frame 3 to rotate between a lowered position (FIGS. 1 and 3) and a raised position (FIG. 2) relative to the vehicle attachment frame 1. However, in the preferred embodiment of the present invention, the hinging linkage 2 comprises a first hinge 21 and a second hinge 22. The first hinge 21 and the second hinge 22 are both hingedly connected between the vehicle attachment frame 1 and the rear portion 31 of the hitch support frame 3. The first hinge 21 and the second hinge 22 are preferably positioned symmetrically about the central arm 32, with the first hinge 21 being positioned adjacent to the first lateral arm 33 and the second hinge 22 being positioned adjacent to the second lateral arm 34.

In the raised position, the hitch support frame 3 is oriented substantially vertically and may be secured behind a door of the towable vehicle. In the lowered position, the hitch support frame 3 is oriented substantially horizontal.

It is contemplated that many different means may be utilized to embody the angular lock 4. However, in the preferred embodiment, the angular lock 4 comprises a first rod receiving slot 41, a second rod receiving slot 42, a third rod receiving slot 43, a fourth rod receiving slot 44, a first locking rod 45, and a second locking rod 46. The first rod receiving slot 41 and the second rod receiving slot 42 are connected to the hitch support frame 3 adjacent to the hinging linkage 2. The third rod receiving slot 43 and the fourth rod receiving slot 44 are positioned within the vehicle support frame adjacent to the hinging linkage 2. The first rod receiving slot 41 and the second rod receiving slot 42 are oriented parallel to each other, as are the third rod receiving slot 43 and the fourth rod receiving slot 44. The third rod receiving slot 43 is laterally aligned with the first rod receiving slot 41, and the fourth rod receiving slot 44 is laterally aligned with the second rod receiving slot 42.

In the preferred embodiment of the present invention, the first rod receiving slot 41 is positioned parallel and adjacent to the first lateral arm 33 of the hitch support frame 3 adjacent to the rear portion 31 of the hitch support frame 3. Likewise, the second rod receiving slot 42 is positioned parallel and adjacent to the second lateral arm 34 adjacent to the rear portion 31. Preferably, the first rod receiving slot 41 and the second rod receiving slot 42 are positioned symmetrically about the central arm 32.

When the hitch support frame 3 is in a lowered position, the first rod receiving slot 41 and the third rod receiving slot 43 are parallel to and aligned with each other, enabling the first locking rod 45 to be removably positioned within the first rod receiving slot 41 and the third rod receiving slot 43, and similarly the second locking rod 46 to be removably positioned within the second rod receiving slot 42 and the fourth rod receiving slot 44, thus physically blocking the hitch support frame 3 to be rotated with respect to the vehicle attachment frame 1. In the preferred embodiment, the third rod receiving slot 43 and the fourth rod receiving slot 44 of the vehicle attachment frame 1 are oriented horizontally with respect to the ground when attached to a trailer or other unpowered towable vehicle. Thus, in the lowered position, the hitch support frame 3 and therefore the first rod receiving slot 41 and the second rod receiving slot 42 are also oriented horizontally. In one embodiment, the hitch support frame 3 is prevented from rotating below horizontal. This may be accomplished simply by positioning the vehicle attachment frame 1 and the hitch support frame 3 recessed from the edge of the towable vehicle, therefore blocking the hitch support frame 3 from rotating beyond the horizontal position with the edge of the towable vehicle. Alternatively, stops may be utilized in any position which accomplishes the same purpose.

The preferred embodiment of the present invention additionally comprises a first locking pin 47 and a second locking pin 48, and the first locking rod 45, the second locking rod 46, the third rod receiving slot 43 and the fourth rod receiving slot 44 each comprise a pin hole 40. The pin hole 40 of the first locking rod 45 and the third receiving slot are concentrically aligned with each other when the first locking rod 45 is engaged within the first rod receiving slot 41 and the third rod receiving slot 43, and similarly the pin hole 40 of the second locking rod 46 and the pin hole 40 of the fourth rod receiving slot 44 are concentrically aligned with each other when the second locking rod 46 is engaged within the second rod receiving slot 42 and the fourth rod receiving slot 44. Therefore, the first locking pin 47 may be removably positioned within the pin hole 40 of the third rod receiving slot 43 and the pin hole 40 of the first locking rod 45, and the second locking pin 48 may be removably positioned within the pin hole 40 of the fourth rod receiving slot 44 and the pin hole 40 of the second locking rod 46.

While the first locking rod 45 and the second locking rod 46 serve to engage the angular lock 4 so that the hitch support frame 3 cannot rotate relative to the vehicle attachment frame 1, the first locking pin 47 and the second locking pin 48 serve to secure the first locking rod 45 and the second locking rod 46 in place to fully secure the angular lock 4. Without the first locking pin 47 and the second locking pin 48 holding the first locking rod 45 and the second locking rod 46 in place, there is a risk of the first locking rod 45 and the second locking rod 46 becoming dislodged and falling out. Additionally, in the preferred embodiment, a third locking pin and a fourth locking pin are comprised. The third locking pin and the fourth locking pin function similarly to the first locking pin 47 and the second locking pin 48, with the difference that the third locking pin and the fourth locking pin secure the first locking rod 45 and the second locking rod 46 to the first rod receiving slot 41 and the second rod receiving slot 42 on the hitch support frame 3, as opposed to the third rod receiving slot 43 and the fourth rod receiving slot 44 on the vehicle attachment frame 1.

The hitching element 5 of the present invention preferably comprises a c-channel 51 with a first side 52 and a second side 53. The first side 52 and the second side 53 are oriented perpendicular to the central arm 32, parallel to each other and comprise at least one bolt hole 520. The first side 52 and the second side 53 are oriented such that a normal vector to the first side 52 and the second side 53 is oriented laterally, parallel to the rear portion 31 of the hitch support frame 3. Each of the at least one bolt hole 520 of the first side 52 is concentrically positioned with one of the at least one bolt hole 520 of the second side 53, so that various different implements and types of hitches may be attached to the hitching element 5. The ability to substitute different type of hitches and other attachments gives the present invention a wide range of versatility for towing applications. In another embodiment, the hitching element 5 comprises a standard hitch ball and does not provide the versatility of being able to substitute different attachments.

The preferred embodiment of the present invention additionally comprises a storage tab 6 that is connected laterally adjacent to the central arm 32, preferably approximately midway along the length of the central arm 32. The storage tab 6 comprises a bolt receiving slot 61 that traverses through the storage tab 6 perpendicular to the central arm 32. The purpose of the storage tab 6 is to secure the hitch support frame 3 in the raised position. In the raised position, the bolt receiving slot 61 will align with a bolt positioned on the exterior of the towable vehicle which will be inserted through the bolt receiving slot 61 with a nut being fastened to the bolt in order to secure the storage tab 6 and thus the hitch support frame 3 in place.

Additionally, the preferred embodiment of the present invention comprises a jack connection 7 that is connected adjacent to the central arm 32 of the hitch support frame 3, similar to the storage tab 6. The storage tab 6 and the jack connection 7, however, are preferably positioned on opposite lateral sides of the central arm 32. The jack connection 7 is a protrusion (or cavity, if suitable) that enables a jack to be attached to the hitch support frame 3 in order to jack the hitch support frame 3 off the ground.

Additionally, in the preferred embodiment, the central arm 32 is hollow. This allows any required cords and wires to be run through the central arm 32 in order to facilitate any necessary electrical connections for legally required lights on the towable vehicle to be operational.

Although the invention has been explained in relation to its preferred embodiment, it is to be understood that many other possible modifications and variations can be made without departing from the spirit and scope of the invention as hereinafter claimed.

What is claimed is:

1. A folding tongue trailer hitch comprising:
   a vehicle attachment frame;
   a hinging linkage;

a hitch support frame;
an angular lock;
a hitching element;
the hitch support frame being hingedly connected to the vehicle attachment frame by the hinging linkage;
the angular lock being releasably engaged between the vehicle attachment frame and the hitch support frame, wherein the angular lock prevents the hitch support frame from rotating with respect to the vehicle support frame when the angular lock is engaged;
the hitching element being connected to the hitch support frame opposite the hinging linkage;
the angular lock comprising a first rod receiving slot, a second rod receiving slot, a third rod receiving slot, a fourth rod receiving slot, a first locking rod and a second locking rod;
the first rod receiving slot and the second rod receiving slot being connected to the hitch support frame adjacent to the hinging linkage;
the third rod receiving slot and the fourth rod receiving slot being positioned within the vehicle support frame adjacent to the hinging linkage;
the first rod receiving slot and the second rod receiving slot being oriented parallel to each other;
the third rod receiving slot and the fourth rod receiving slot being oriented parallel to each other;
the third rod receiving slot being laterally aligned with the first rod receiving slot;
the fourth rod receiving slot being laterally aligned with the second rod receiving slot;
the first locking rod being removably positioned within the first rod receiving slot and the third rod receiving slot; and
the second locking rod being removably positioned within the second rod receiving slot and the fourth rod receiving slot.

2. The folding tongue trailer hitch as claimed in claim 1 further comprising:
the hitch support frame comprising a rear portion, a central arm, a first lateral arm and a second lateral arm;
the hinging linkage being connected between the vehicle attachment frame and the rear portion; and
the central arm being connected between the rear portion and the hitching element.

3. The folding tongue trailer hitch as claimed in claim 2 further comprising:
the first lateral arm and the second lateral arm being positioned symmetrically about the central arm.

4. The folding tongue trailer hitch as claimed in claim 2 further comprising:
the first lateral arm and the second lateral arm being connected between the rear portion and the central arm adjacent to the hitching element.

5. The folding tongue trailer hitch as claimed in claim 1 further comprising:
the first rod receiving slot being positioned parallel and adjacent to a first lateral arm of the hitch support frame adjacent to a rear portion of the hitch support frame; and
the second rod receiving slot being positioned parallel and adjacent to a second lateral arm of the hitch support frame adjacent to the rear portion.

6. The folding tongue trailer hitch as claimed in claim 1 further comprising:
the first rod receiving slot and the second rod receiving slot being positioned symmetrically about a center arm of the hitch support frame.

7. The folding tongue trailer hitch as claimed in claim 1 further comprising:
a first locking pin and a second locking pin;
the first locking rod, the second locking rod, the third rod receiving slot and the fourth rod receiving slot each comprise a pin hole;
the first locking pin being removably positioned within the pin hole of the third rod receiving slot and the pin hole of the first locking rod; and
the second locking pin being removably positioned within the pin hole of the fourth rod receiving slot and the pin hole of the second locking rod.

8. The folding tongue trailer hitch as claimed in claim 1 further comprising:
the hitching element comprising a c-channel with a first side and a second side;
the first side and the second side each comprising at least one bolt hole; and
each of the at least one bolt hole of the first side being positioned concentrically with one of the at least one bolt hole of the second side.

9. The folding tongue trailer hitch as claimed in claim 1 further comprising:
the hitching element comprising a hitch ball.

10. The folding tongue trailer hitch as claimed in claim 1 further comprising:
the hinging linkage comprising a first hinge and a second hinge; and
the first hinge and the second hinge being hingedly connected between the vehicle attachment frame and a rear portion of the hitch support frame.

11. The folding tongue trailer hitch as claimed in claim 10 further comprising:
the first hinge being positioned adjacent to a first lateral arm; and
the second hinge being positioned adjacent to a second lateral arm.

12. The folding tongue trailer hitch as claimed in claim 1 further comprising:
a storage tab;
the storage tab being connected laterally adjacent to a central arm of the hitch support frame; and
the storage tab comprising a bolt receiving slot traversing through the storage tab perpendicular to the central arm.

13. The folding tongue trailer hitch as claimed in claim 1 further comprising:
a jack connection; and
the jack connection being connected adjacent to a central arm of the hitch support frame.

* * * * *